(12) United States Patent
Sved et al.

(10) Patent No.: US 6,877,127 B2
(45) Date of Patent: Apr. 5, 2005

(54) QUALITY CONTROL IN DATA TRANSFER AND STORAGE APPARATUS

(75) Inventors: Jorge Antonio Sved, Bristol (GB); Jonathan Peter Buckingham, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 539 days.

(21) Appl. No.: 09/917,769

(22) Filed: Jul. 31, 2001

(65) Prior Publication Data

US 2003/0028840 A1 Feb. 6, 2003

(51) Int. Cl.[7] .............................................. G11C 29/00
(52) U.S. Cl. ...................... 714/771; 714/799; 714/800; 360/53
(58) Field of Search ....................... 714/771, 799, 714/800, 759, 764, 704, 701, 746, 719, 718; 360/53

(56) References Cited

U.S. PATENT DOCUMENTS

| 5,293,285 A | | 3/1994 | Leonhardt et al. |
| 5,416,782 A | * | 5/1995 | Wells et al. ............... 714/719 |
| 5,576,903 A | | 11/1996 | Brown et al. |
| 5,974,581 A | | 10/1999 | Nagai et al. |
| 6,018,434 A | | 1/2000 | Saliba |
| 6,092,231 A | | 7/2000 | Sze |
| 6,581,184 B1 | * | 6/2003 | Saeki et al. ................. 714/800 |
| 6,584,527 B2 | * | 6/2003 | Verinsky et al. ............ 710/305 |

FOREIGN PATENT DOCUMENTS

| EP | 0957484 A1 | 11/1999 |
| EP | 0984451 A1 | 3/2000 |

OTHER PUBLICATIONS

"New 8 mm Is Ideal for Automated Storage," J. Gast, *Computer Technology Review* Mar. 11, 1991 No. 3, pp. 26, 28–29.

* cited by examiner

*Primary Examiner*—Phung My Chung

(57) ABSTRACT

Data from a host computer is buffered, transferred to a logical formatter, compressed and converted to a format suitable for storage on a magnetic tape before being arranged and written sequentially into a main buffer where parity bytes are added as each row of a dataset is written. A physical formatter takes the data sequentially from the main buffer and writes them as codeword quadsets in plural tape tracks. A determination of whether each codeword quadset is acceptably recorded is made by evaluating each codeword quadset for header and codeword quadset pair errors and combining the evaluations.

12 Claims, 4 Drawing Sheets

| Bit name | Bit | Description |
|---|---|---|
| good_ccqs(0) | 0 | 1 => CCQs marked 0000 are *good*<br>0 => CCQs marked 0000 are *bad* |
| good_ccqs(1) | 1 | 1 => CCQs marked 0001 are *good*<br>0 => CCQs marked 0001 are *bad* |
| good_ccqs(N) | N | 1 => CCQs marked $N_{bin}$ are *good*<br>0 => CCQs marked $N_{bin}$ are *bad* |
| good_ccqs(14) | 14 | 1 => CCQs marked 1110 are *good*<br>0 => CCQs marked 1110 are *bad* |
| good_ccqs(15) | 15 | 1 => CCQs marked 1111 are *good*<br>0 => CCQs marked 1111 are *bad* |

QUALITY CONTROL IN DATA TRANSFER AND STORAGE APPARATUS

FIELD OF THE INVENTION

This invention relates generally to apparatus for transfer and storage of data and, in particular, to apparatus for the transfer and storage of data from a host computing system to a magnetic tape cartridge or the like.

BACKGROUND TO THE INVENTION

In recent years, it has become increasingly common for companies and other such organisations to back-up their computing systems (and other in-house back-up systems) by storing data on a series of magnetic tape cartridges, for retrieval in the event that the data is lost or corrupted in the primary systems.

It will be appreciated that it is essential that such back-up data is accurately and completely stored and, in many systems, the integrity/accuracy of the data recorded to a magnetic tape cartridge or the like is checked by reading back data from the tape cartridge, checking the data read back for errors, and rewriting to the tape cartridge any data found to contain such errors. In fact, an industrial format has been defied for this type of transfer and storage system, in which it is stated that, if a block of data is read back containing one byte in error, it must be rewritten. However, such a strict requirement results in a lot of unnecessary wastage of tape due to excessive rewriting of blocks of data in the presence of random bit errors. Further, such unnecessary rewrites result in the transfer and storage of data taking an excessive amount of time.

We have devised an arrangement which overcomes these problems and provides a method and apparatus for effective and efficient data back-up.

SUMMARY OF THE INVENTION

In accordance with a first aspect of the present invention, there is provided apparatus for transferring data from a host system to one or more magnetic tape storage devices for retrieval if required by data retrieval apparatus, the apparatus comprising input apparatus for receiving said data and dividing it into a number of blocks of data, apparatus for adding to each of said blocks of data error detection/correction data to provide each block of data with a predetermined error detection/correction capability, at least one data writer for writing said blocks of data to said one or more storage devices, at least one data reader for reading back data written to said one or more storage devices and transferring said data from the at least one data reader to error checking apparatus, said error checking apparatus being arranged to determine whether or not there are any errors in a block of data and, if so, whether the number of errors exceeds a predetermined number, said error checking apparatus being further arranged to output a signal if the number of errors in a block of data exceeds said predetermined number and being configured such that said predetermined number may be one of a plurality of numbers between 0 and n, where n is an integer.

The first aspect of the present invention also extends to a method for transferring data from a host system to one or more magnetic tape storage devices for retrieval if required by data retrieval apparatus, the method comprising the steps of receiving said data and dividing it into a number of blocks of data, adding to each of said blocks of data error detection/correction data to provide each block of data with a predetermined error detection/correction capability, writing said blocks of data to said one or more storage devices, reading back data written to said one or more storage devices, determining whether or not there are any errors in a block of data and, if so, whether the number of errors exceeds a predetermined number, and outputting a signal if the number of errors in a block of data exceeds said predetermined number, wherein said predetermined number may be one of a plurality of numbers between 0 and n, where n is an integer.

Thus, in a system whereby 6 parity bytes are added to each block of data such that 3 bytes in error can be detected and corrected in each block, then the predetermined number could be set to 3 (provided the data retrieval apparatus error correction scheme can cope with detecting and correcting three errors). The error checker would then only give a negative output and cause a block of data to be rewritten if the number of errors in that block is greater than 3. As such, the number of blocks of data resulting in a negative output by the error checker (which determines whether or not a block of data is rewritten) would reflect only those blocks of data with an incorrectable number of errors.

Thus, the first aspect of the present invention provides a generic system which allows much finer control at the design stage as to whether or not blocks of data are rewritten, thereby optimising the tape storage capacity according to user or customer requirements. The predetermined number can be set to 0, to provide the same accuracy of data storage as is provided in some prior art systems. However, if the predetermined number is set to 1, 2 or 3, then blocks of data having a number of bytes in error which is less than or equal to n (n=1, 2, 3) will not be rewritten, on the basis that such errors can be corrected when the data is retrieved, thereby avoiding unnecessary wastage of tape storage capacity.

The first aspect of the present invention also extends to an error processing unit, comprising input apparatus for receiving blocks of data, error checking apparatus for determining whether there are any errors in a block of data and, if so, whether the number of errors in said block of data exceeds a predetermined number, and output apparatus for outputting one of two signals indicating that the number of errors respectively exceeds or does not exceed said predetermined number, wherein said predetermined number may be one of a plurality of numbers between 0 and n, where n is an integer.

If n (which would normally reflect the number of errors which are correctable in a codeword according to the number of parity bytes added for that purpose) is 3, for example, the threshold which determines the value of the output from the error processing unit can be set at 0, 1, 2 or 3, according to user requirements. It should be noted that, although the error checking means or error processing unit used in the present invention may have or be given the capability to correct the errors it detects, it is not intended to do so in the context of the present invention: it is simply intended to give a boolean output to the write chain controller in a physical formatter or the like to determine whether or not a block of data is to be rewritten.

In practice, the present invention has been found to reduce the data rewrite rate from 30% to a small fraction of 1% for a typical configuration and a background bit error rate of 1 in $10^5$, while making subsequent retrieval or restore operations reliable.

In accordance with a second aspect of the present invention, there is provided apparatus for transferring data from a host system to one or more magnetic tape storage devices for retrieval, if required, by data retrieval apparatus including error correction apparatus, the apparatus comprising input apparatus for receiving said data and dividing it into a number of blocks of data, apparatus for adding to each of said blocks of data error detection/correction data to provide said data retrieval apparatus error correction apparatus with the capability to detect/correct up to X errors in a block of data, where X is an integer, at least one data writer for writing said blocks of data to said one or more storage devices, at least one data reader for reading back data written to said one or more storage devices and transferring said data from the at least one data reader to error checking apparatus, said error checking apparatus being arranged to determine whether there are any errors in a block of data and, if so, whether the number of errors in a block of data exceeds a predetermined number Y and, if so, to output a signal accordingly, wherein Y is an integer and Y≦X.

The second aspect of the present invention also extends to a method of transferring data from a host system to one or more magnetic tape storage devices for retrieval, if required, by data retrieval apparatus including error correction apparatus, the method including the steps of receiving said data and dividing it into a number of blocks of data, adding to each of said blocks of data error detection/correction data to provide said data retrieval apparatus error correction apparatus with the capability to detect/correct up to X errors in a block of data, where X is an integer, writing said blocks of data to said one or more storage devices, reading back data written to said one or more storage devices, determining whether there are any errors in a block of data and, if so, whether the number of errors in a block of data exceeds a predetermined number Y and, if so, outputting a signal accordingly, wherein Y is an integer and Y≦X.

Thus, once again, in a system whereby 6 parity bytes are added to each block of data such that 3 bytes in error can be detected and corrected in each block then the predetermined number could be set to 3 (provided the data retrieval apparatus error correction scheme can cope with detecting and correcting three errors). The error checker would then only give a negative output and cause a block of data to be rewritten if the number of errors in that block is greater than 3. As such, the number of blocks of data resulting in a negative output by the error checker (which determines whether or not a block of data is rewritten) would reflect only those blocks of data with an incorrectable number of errors.

In the case of the exemplary system referred to above, Y may be 1, 2 or 3, in which case, blocks of data having a number of bytes in error which is less than or equal to Y (Y=1, 2, 3) will not be rewritten on the basis that such errors can be corrected when the data is retrieved, thereby avoiding unnecessary wastage of tape storage capacity.

In the case of both the first and second aspects of the present invention, the means for reading data written to the storage means is beneficially adapted to read back data just written to the storage means (as subsequent blocks of data are still being written to the storage means). This technique is known as 'Read While Write' (RWW). The provision of such an RWW function in this type of system necessitates the provision of means for storing the history of data blocks written to the storage means so that it can be determined whether a data block has been written to tape and, if so, whether it has been rewritten and how many times, thereby ensuring that all data blocks have been correctly written to the tape for reliable retrieval of the data when required.

In conventional systems, the means for storing the history of data blocks written to tape comprises one or more large memory blocks which store the history of all data blocks written to tape, in the order in which they were written. When a data block is written to tape, it (or at least information identifying it) is stored in the history storage means. When the information relating to a data block is written to the history storage means, at least one bit is allocated to each codeword pair included therein, such bits being intended to indicate the quality of the blocks of data as determined during the RWW process described above.

During the RWW process, the error checking block checks each block of data for errors and, in the event that an error is detected in a data block, returns a negative output and sets the quality bit in the history storage means to '0'. If no errors are detected in the data block, a positive output is returned by the error checking block and the quality bit in the history storage means is set to '1'. When all of the quality bits for a data block are set (or some predetermined threshold has been exceeded), the system checks the quality bits in the history storage means for that data block and if any errors are indicated (i.e. if any of the quality bits are '0'), then the data block is rewritten.

We have now devised an improved arrangement which seeks to provide a more flexible and efficient system, without compromising the integrity of the data recorded to the storage means, the improved arrangement potentially providing one preferred embodiment of the first and/or second aspects of the present invention.

In accordance with a third aspect of the present invention, there is provided apparatus for transferring data from a host computing system to one or more magnetic tape storage devices or the like, the apparatus comprising input apparatus for receiving data and dividing it into blocks, at least one data writer for writing said blocks of data in sets of a plurality of blocks to said one or more storage devices, at least one data reader for reading back data written to said one or more storage devices and transferring said read data to error checking apparatus, said error checking apparatus being arranged to determine if a block of data includes any errors and generate a positive output if the number of errors in said block of data is zero or does not exceed a predetermined number and/or a negative output if the number of errors in said block of data is greater than zero or exceeds a predetermined number, history store apparatus for storing information relating to at least some of the sets of data written to said one or more storage devices together with information corresponding to the output of said error checking apparatus for each block of data in a set, and apparatus for causing said at least one data writer to rewrite a set of blocks of data to said one or more storage devices if the output generated by the error checking apparatus and stored in said history store is negative for more than a predetermined number of the blocks of data and/or a predetermined number or density within a block or set of data, said apparatus for causing said at least one data writer to rewrite sets of data being configured such that said predetermined number or density may be selected according to user requirements.

Also in accordance with the third aspect of the present invention, there is provided a method for transferring data from a host computing system to one or more magnetic tape storage devices or the like, the method comprising the steps of receiving data and dividing it into blocks, writing said blocks of data in sets of a plurality of blocks to said one or more storage devices, reading back data written to said one or more storage devices and transferring said read data to error checking apparatus, determining if a block of data includes any errors and generating a positive output if the number of errors in said block of data is zero or does not exceed a predetermined number and/or a negative output if the number of errors in said block of data exceeds a predetermined number, storing in a history store information relating to at least some of the sets of data written to said one or more storage devices together with information corresponding to the output of said error checking apparatus for each block of data in a set, and rewriting a set of blocks of data to said one or more storage devices if the output generated by the error checking apparatus and stored in said history store is negative for more than a predetermined number of the blocks of data and/or a predetermined number or density within a block or set of data, wherein said predetermined number or density may be selected according to user requirements.

The apparatus according to the first, second and/or third aspects beneficially includes means for converting the blocks of data to a format suitable for storage on the storage means if required.

The data is preferably written to the tape in codeword quad (or CQ) sets comprising an array, beneficially 2×8, of ECC encoded codeword pairs. Each CQ set is preferably identified in the history storage means by at least 47 bits of data, comprising 1 valid bit, 32 row quality bits (2 row quality bits per codeword pair), 1 dataset bit, 6 cqset bits, 4 acn bits and 3 rotation bits.

The row quality bits for each codeword pair are both beneficially set to 0 when a CQ set is first written to the storage means. The apparatus preferably includes means for determining whether the header of a read codeword pair is correct and, if so, whether each codeword is good or bad, depending on the number of errors they contain, the apparatus further comprising means for setting the row quality bits to indicate die result of such error checking. In a preferred embodiment, the row quality bits are set to 00 if the header of the codeword pair is corrupted (so that the codeword pair cannot be identified), 01 if the header is correct but both codewords are bad, 10 if the header is correct but only one of the codewords is good, and 11 if the header is correct and both codewords are good.

In a preferred exemplary embodiment of the third aspect of the present invention, there is provided a programmable N-bit look-up table which can be used to define the quality criteria by which a codeword quad is determined to be good or bad, i.e. whether they need to be rewritten or not, where N is the number of combinations of 1's and 0's which can occur in the row quality bits for each codeword quad in a set. In this case, therefore, with 2 row quality bits for each codeword pair, there are 4 row quality bits for a codeword quad and the number of different possible combinations of 1's and 0's is 16, giving a programmable 16-bit look-up table which can be used to set the quality criteria by which codeword quads are determined to be good or bad.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
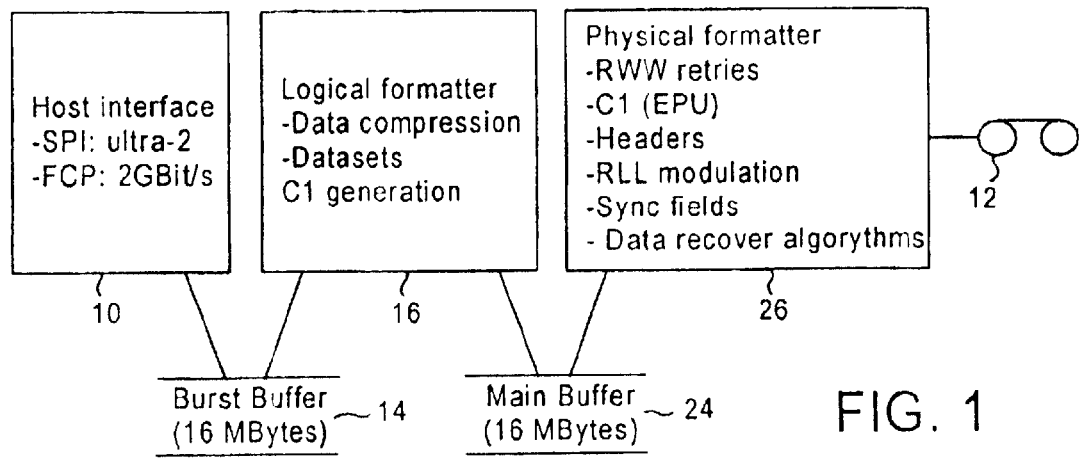
FIG. 1 is a schematic block diagram illustrating the flow of data from a host computing system through a magnetic tape drive according to an exemplary embodiment of the invention.

Referring to FIG. 1 of the drawings, there is illustrated schematically an exemplary system for transferring data from a host computer interface 10 to a magnetic tape cartridge 12. Typically, data is output from the host computer interface 10 in shot sharp bursts, where it is much more desirable to provide a steady stream of data to a read head for storage on a magnetic tape cartridge 12, in order to minimise wear on the read head motors and optimise the efficiency and storage capacity of the tape cartridge. Data from the host computer interface 10 is buffered in a burst buffer 14 before transfer to a logical formatter 16, the burst buffer 14 isolating the logical formatter 16 from the high speed bursts. Data is compressed by the logical formatter 16, which then arranges the data into "datasets", as described below.

Figure 2:
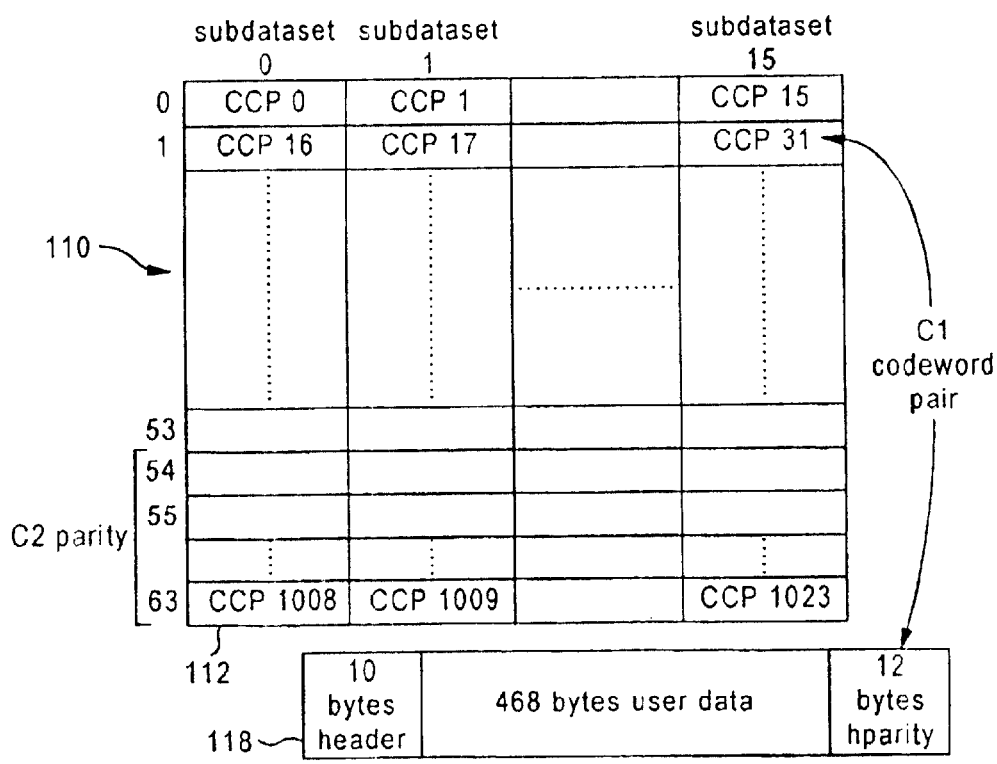
FIG. 2 is a schematic diagram illustrating the structure of a dataset.

Referring to FIG. 2 of the drawings, there is illustrated schematically a dataset 110, consisting of 16 sub datasets 112, each containing 54 rows of data. In this embodiment of the present invention, the sub datasets 112 are the basic data units processed by the ECC algorithm, and each sub dataset is convened to a C1 sub dataset by processing using a C1 ECC algorithm. The datasets 110 are written sequentially into a main buffer 14 which acts to smooth the data to provide a substantially steady stream of data for transfer to the magnetic tape cartridge 12. As each row of a dataset 10 is written into the main buffer 14 from the logical formatter 16, it is notionally split into two equal sets of data, and 6 parity bytes: (Reed-Solomon) are added to each set by a C1 generator to produce two codewords. The bytes of the two codewords in each row are interleaved to produce a matrix of C1 codeword pairs (CCP's) which is stored in the main buffer 14 before transfer to a physical formatter 16.

Datasets 110 are taken sequentially from the main buffer 14 by the physical formatter 16 and written to the magnetic tape 12. Prior to writing the data to the tape 12, the physical formatter 16 adds a header 118 to each CCP. It also notionally splits each sub dataset 112 into a number of C2 codewords and adds 10 parity bytes to each. The header 118 includes, among other things, a dataset number and a CCP designator (i.e. a number from 0–1023) to indicate which dataset a CCP comes from and where in that dataset the CCP was located. This information is important when it comes to retrieving the data from the magnetic tape. The physical formatter 16 also RLL (run length limited) encodesF all data and adds synchronisation fields.

Figure 3:
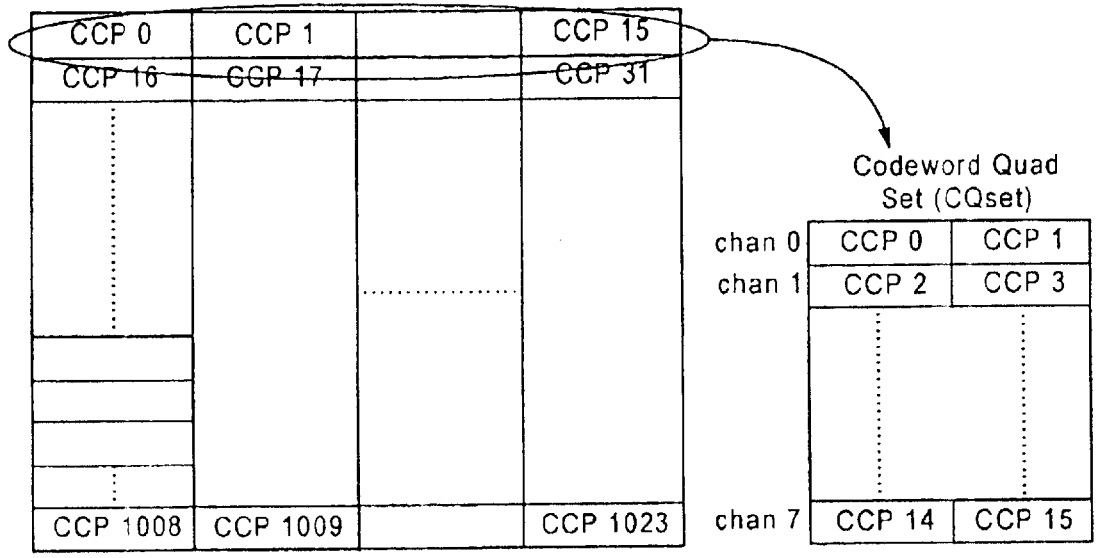
FIG. 3 is a schematic diagram illustrating the conversion of a dataset to a codeword quad.
Figure 4:
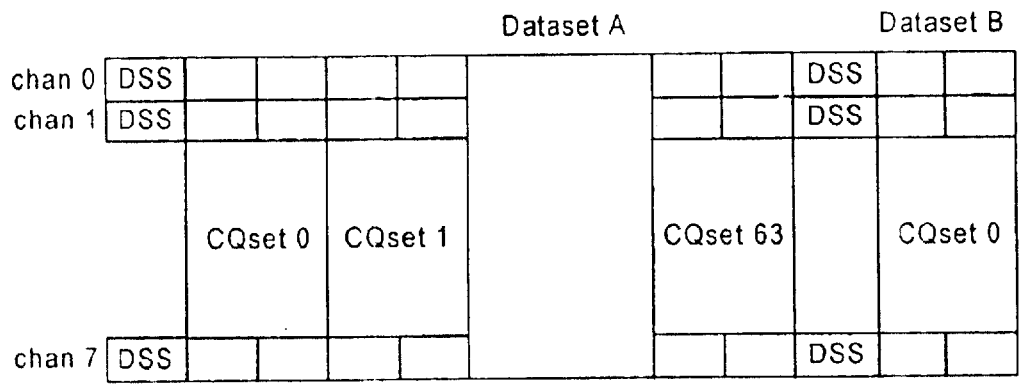
FIG. 4 is a schematic diagram illustrating the format of data written to a magnetic tape head.
Figures 7, 8:
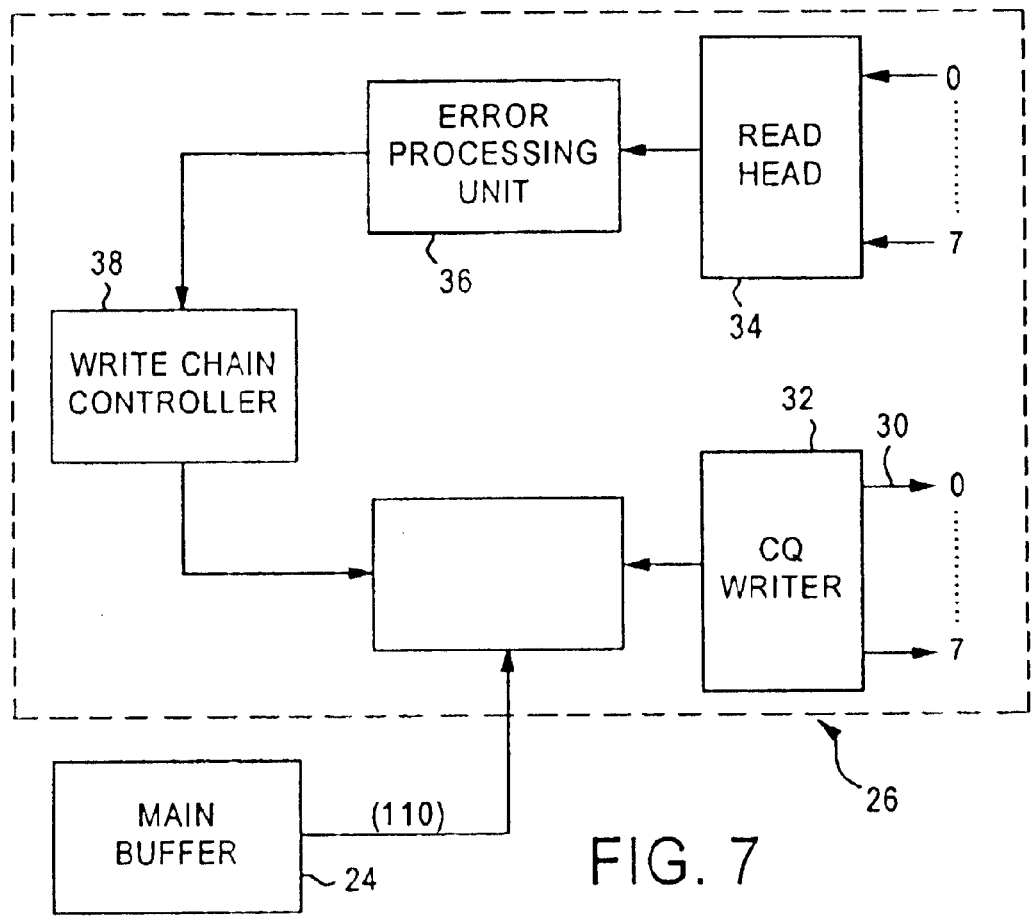
FIG. 7 is a schematic block diagram illustrating the main buffer and physical formatter of the apparatus described with reference to FIG. 1.
FIG. 8 is a schematic diagram illustrating a programmable 16-bit look-up table for use in an exemplary embodiment of the present invention to set the quality criteria by which a codeword quad is determined to be good or bad.

In the tape drive of this exemplary embodiment, as illustrated in FIG. 7, there are eight parallel write beads 30 or channels for simultaneously writing data along the tape media. Thus, the physical formatter 26 includes a "CQ writer" 32 which takes each row of a dataset in turn, and converts it into a Codeword Quad (or CQ) set. Referring to FIG. 3 of the drawings, a CQ set comprises a 2×8 array containing the 16 CCP's in a row of a dataset. Each row of the CQ set is then written to tape via a respective one of the 8 channels. This has the benefit of spreading the C2 codewords along the full physical length of a dataset on tape, thereby minimising the chance of media defects exceeding the C2 correction budget for any particular codeword. Thus, a dataset is written as 64 CQ sets, as shown in FIG. 4 of the drawings, and written to tape, each dataset being separated by a DataSet Separator (or DSS) tone, the DSS consisting of a a repeated binary pattern. A CQ set is formed of 8 codeword quads (CQ's) which are produced by adding header information to two codeword pairs.

A read head 34 follows each write head 30 to read back data which has just been written to tape so as to evaluate the written data for quality. An error processing unit 36 checks the data read by the read head 34 and determines whether or not there are more than a predetermined number of errors in each codeword pair (CP) of each CQ set, the predetermined number being dependent upon the error correction capability of the error correction scheme used in the data retrieval apparatus for ultimately retrieving the data if required. If the number of errors in a codeword in found to be equal to or less than the predetermined number, the error processing unit returns a positive output for that codeword. If, however, the number of errors detected in a codeword is greater than the predetermined number, the error processing unit returns a negative output (C1 failure) for that codeword. A write chain controller (WCC) 38 receives the output (known as the CCP RWW status) from the error processing unit and, if the number of C1 failures in a CCQ set exceeds a predetermined number, it causes that CCQ set to be rewritten. This process is known as Read While Write (RRW) Retry.

Figure 5:
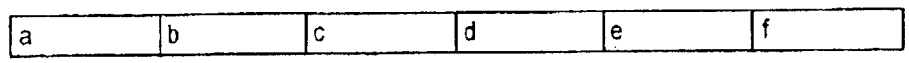
FIG. 5 is a schematic diagram illustrating the sequence in which data might be written to a magnetic tape head.

Obviously, there will be some latency, ie delay, between the write chain controller initially causing a CQ set to be written to tape, and receiving a negative output from the checker block for that CQ set. Thus, a number of intervening CQ sets will have been written to tape before the faulty CQ set is rewritten. Referring to FIG. 5 of the drawings, CQ sets a, b, c and d are sequentially written to tape. By the time CQ set d has been written to tape, the write chain controller has received a number of C1 failures from the C1 checker for CQ set b which exceeds the predetermined threshold, and causes this CQ set to be rewritten. It then resumes sequentially writing CQ sets c and f before receiving sufficient C1 failures (again) from the C1 checker for the rewritten CQ set b, and causing this CQ set to be rewritten once again.

It should be noted that, each time the write chain controller decides to rewrite a CQ set, it causes the CP rows:(ie the CQ's) in that CQ set to be rotated before it is rewritten. Thus, for the first rewrite, the bottom row or CQ in the set is moved to the top of the set, and the remaining CQ's are moved down by one row, so each CQ is written to a different track when the CQ set is rewritten. If one of the tracks is faulty, every CQ set will contain an error and be caused to be it rewritten. However, because the CQ's are rotated for each rewrite, a CQ set need only be rewritten seven times to ensure that all of the CQ's have been correctly stored (on the basis that each CQ will have been written to at least one non-faulty write head.

Figure 6:
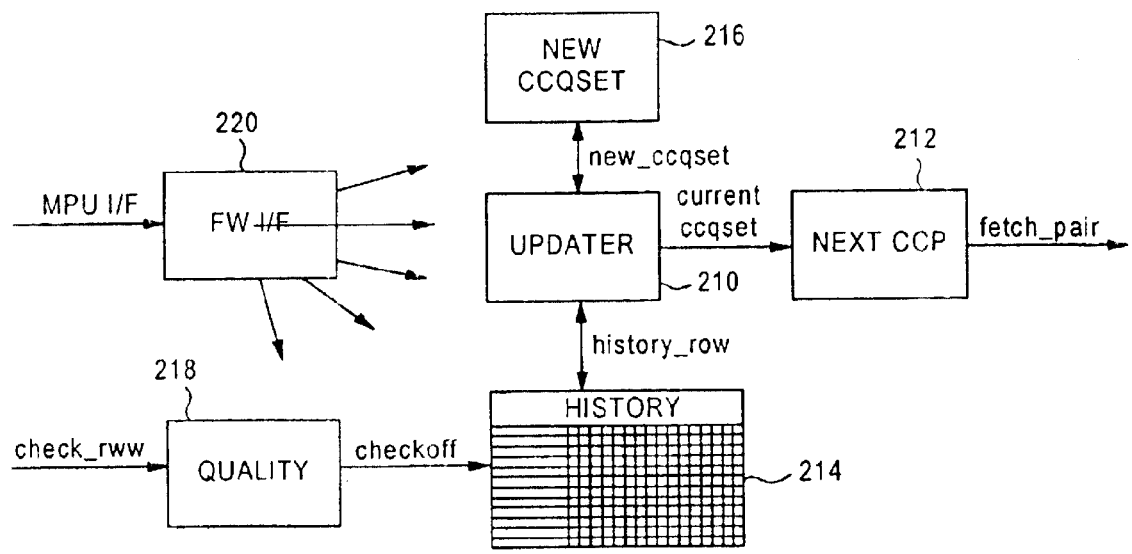
FIG. 6 is a schematic block diagram of a write chain controller (WCC) for use in apparatus according to an exemplary embodiment of the present invention.

Referring to FIG. 6 of the drawings, a write chain controller according to an exemplary embodiment of the invention comprises an updater 210 which is the entity in charge of deciding which CQ set to write next to a magnetic tape cartridge (not shown). The selected CQ set is sent to a 'next ccp' block 212 for sequencing of CCP's within that CQ set. The 'next ccp' block 212 also requests further CQ sets as necessary.

Information relating to the selected CQ set is also stored in a history array 214, in case it needs to be rewritten later. The history array 214 is essentially a multiport memory, and this array together with the logic closest to it (not shown) form a history entity. Another entity, 'New CQ set' 216, provides the updater 210 with the next new CQ set to be written. However, if a previously written CQ set needs to be rewritten, then the updater 210 gives them priority over the new CQ sets.

A quality control block 218 analyses the error checking information returned for each CCP, and produces checkoff signals (to be described later) which are input to the history entity. A FWIF block 220 is intended to represent all of the other primary elements of the write chain controller. The FWIF block 220 decodes addresses, controls all interactions with the MPU, contains all of the addressable registers and generates status and interrupts.

Data representing all CQ sets written to tape is stored in lie history block 214, such data including two rowqual bits for each CCP in a CQ set. Rowqual bits 0,1 are for the first CCP of a CQ on channel 0, bits 2,3 are for the second CCP on channel 0, bits 4,5,6,7 are for the two CCP's on channel 1, and so on until bits 28,29,30,31 for the CCP's on channel 7. When a CQ set is written to the magnetic tape and its identifying data written to the history array, all 32 rowqual bits are usually initially set to 0 (although under certain circumstances, the updater may write 1111 in some rewritten rowqual bits.

As explained above, after a CQ set has been written to the tape, the written data is read back and an error checker is used to check for errors in the CQ set. It checks the header of each CCP in the CQ set against the information stored in the history array. If a match is found, it checks for errors in the codewords of each CCP, and sets the rowqual bits in the history array for each CCP in the matching CQ set according to the result. In the event that the header information read back is corrupted, the rowqual bits for that particular codeword pair are set to 00. If the header information is found to be correct, but both codewords contain errors (or more than a predetermined number of errors), the rowqual bits are set to 01. If the header information is correct and one of the codewords in a codeword pair is good, the rowqual bits are set to 10. Finally, if the header information is correct and both codewords in a codeword pair are good, the rowqual bits are set to 11. This process is known as 'checkoff' and results in a series of 32 bits set to either 1 or 0.

The quality criteria by which a codeword is determined to be good or bad may be rigid, as in conventional systems, whereby if a C1 codeword is found to have a single error it is marked as being bad. However, in a C1 codeword having 6 parity bytes, it is possible to detect and correct 3 bytes in error during data retrieval. Thus, by applying such rigid quality criteria, many CQ sets are rewritten unnecessarily. In accordance with an exemplary embodiment of the present invention, the quality criteria by which a codeword is determined to be good or bad is definable, in this example as 1, 2 or 3. Thus, if for example, the threshold is set to 2, then only codewords having more than two errors will be marked as being bad.

Whether or not a CQ set needs to be rewritten is determined according to the number of rowqual bits set to '1' for a particular CQ set in the history array after a predetermined threshold has been exceeded.

The history block also contains, among other things, reading muxes for the updater and the processor for accessing rows of the history array.

The newcqset block 216 is a simple block, having only one main function. It receives an advance_newcqset pulse, in response to which it indicates which new (i.e. not rewritten) CQ set comes next.

On the other hand, the updater 210 block is arguably the most complex block in the write chain controller. When the nextccp block 212 needs to generate another fetchpair operation (in order to get the next CCP of a CQ set for writing onto the magnetic tape), if it has finished all the CCP's for the current CQ set, it asks the updater for the next CQ set by asserting next_cqset_please. The updater then takes a few clock cycles to work it out, and responds with a next_cqset_ready pulse and all the details for the next current CQ set, which will not change until the following next_cqset_ready pulse is generated.

FIG. 8 illustrates a programmable 16-bit look-up table used for setting the quality criteria by which codeword quads are determined to good or bad, i.e. whether they need rewriting or not As shown, in the look-up table, each of the 16 good_ccqs bits 0 to 15 can be set to 0 or 1 to set whether a particular combination of row quality bits associated with a codeword quad causes that codeword quad to be rewritten or not. Thus, for example, good_ccqs bit (0) can can be set to 1 if codeword quads marked 0000 are to be considered to be good, and 0 if that combination of row quality bits is to be considered to be bad. Similarly, good_ccqs bit (1) can be set to 1 if the combination 0001 is to be considered good, and 0 if that combination is to be considered to be bad, and so on for all combinations of row quality bits. Note for the avoidance of doubt, if any of the codeword quads in a CQ set is considered to be bad and has to be rewritten, then the entire CQ set to which that CQ belongs is rewritten.

In summary, in data transfer and storage operations such as that described above, there is a need to read data back from the tape on which it has just been written, in order to determine whether that data needs to be rewritten to the tape because it has not been written to tile tape with sufficient quality to ensure reliable retrieval of the data when required. Information relating to the blocks of data written to the tape is stored together with information output from the error checking block regarding the quality of each codeword pair in a block (or CQ set). The number and pattern of errors in each codeword quad determines whether or not it needs to be rewritten, and this quality threshold is also user-definable. Thus, data can be written to tape much faster, and tape capacity can be saved because it is possible to only rewrite the CQ sets which are in danger of not being recoverable when required. In other words, the present invention avoids the occurrence of an excessive number of rewritten CQ sets due to the number of random bit errors, which would otherwise result in a wastage of tape and a reduction of the speed at which the data could otherwise be transferred and stored.

Although the present invention has been described by way of examples of a preferred embodiment, it will be evident that other adaptations and modifications may be employed without departing from the scope of the invention as defined by the appended claims. Further, the terms and expressions employed herein have been used as terms of description and not of limitation; and, thus, there is no intent to exclude equivalents, but on the contrary it is intended to cover any and all equivalents which may be employed without departing from the scope of the invention as defined by the appended claims.

What is claimed is:

1. Apparatus for transferring data from a host computing system to a magnetic tape storage means or the like, the apparatus comprising means for receiving data and dividing it into blocks, means for writing said blocks of data in sets of a plurality of blocks to said storage means, means for reading back data written to said storage means and transferring said read data to error checking means, said error checking means being arranged to determine if a block of data includes any errors and generate a positive output if the number of errors in said block of data is zero or does not exceed a predetermined number and/or a negative output if the number of errors in said block of data is greater than zero or exceeds a predetermined number, history storage means for storing information relating to at least some of the sets of data written to said storage means together with information corresponding to the output of said error checking means for each block of data in a set, and means for rewriting a set of blocks of data to said storage means if the output generated by the error checking means and stored in said history storage means is negative for more than a predetermined number of the blocks of data and/or a predetermined number or density within a block or set of data, said means for rewriting sets of data being configured such that said predetermined number or density is definable according to user requirements;

each of said sets of data being identified in said history storage means by a plurality of bits of data, said bits of data comprising at least two quality bits relating to each block of data in a set;

said quality bits being set to '0' when the respective block of data is initially written to said storage means;

each block of data comprising a header and two codewords;

said error checking means is arranged to determine if the header of a block of data contains an error and, if so, to set the respective quality bits to '00'; and if the header of a block of data is determined to contain no errors, the error checking means is arranged to determine if either of the codewords in the block of data contains an error and to set the row quality bits to '01' if both codewords are determined to contain one or more errors, to '10' if only one of the codewords in the block of data is determined to contain at least one error, and to '11' if both codewords are determined to contain no errors; and an N-bit look-up table which can be used to define the quality criteria by which a block of data is to be rewritten or not, wherein N is the number of combinations of 1's and 0's which can occur in the quality bits for each block of data in a set.

2. Apparatus according to claim 1, wherein two row quality bits are provided for each block of data in a set, the apparatus comprising a 16-bit look-up table to define the quality criteria by which a block of data is to be rewritten or not.

3. A method of determining if data on an elongated storage medium having I recorded parallel elongated tracks storing a data set including J=2I sub datasets has areas that require some data in the data set to be rewritten; each sub dataset including K codeword pairs and L parity bytes having values determined by bits in the K codeword pairs of the particular sub dataset; each codeword pair including (a) a header identifying the codeword, (b) user data and (c) parity bytes; the tracks being divided into M=(K+L) longitudinal segments where said dataset is stored; segment m including the I tracks, track i of segment m including longitudinally spaced codeword pairs from different sub datasets, where m=0 . . . (M−1), i=0 . . . (I−1) so that segment i stores a codeword quad set including J codeword pairs from the J sub datasets, the method comprising:

storing a plurality of bits for each codeword pair of each codeword quad set;

attempting to read each codeword quad set from the medium;

determining, from each header successfully read from the medium, the codeword pair identification of each codeword in the quad sets successfully read from the header and reading the remainder of the codeword pair successfully read from the medium;

checking for errors in the codeword of each identified codeword pair;

responding to an unsuccessful attempt to read the header by setting the stored bits to a first combination for the codeword pair having the header that was unsuccessfully read;

responding to a successful attempt to read the header and an indication derived from the checked errors that both codeword pairs of a read track of a codeword quad set contains as many as N error(s) (where N is one or more) by setting the stored bits for both codeword pairs of the read track to a second combination;

responding to a successful attempt to read the header and an indication derived from the checked errors that only one codeword pair of a read track of a codeword quad set contains as many as N error(s) by setting the stored bits for both codeword pairs of the read track to a third combination;

responding to a successful attempt to read the header and an indication derived from the checked errors that none of the codeword pairs of a read track of a codeword quad set contains as many as N error(s) by setting the stored bits for both codeword pairs of the read track to a fourth combination; and determining if a codeword quad set should be rewritten by responding to the stored plurality of bits for each codeword quad set that has been checked for errors.

4. The method of claim 3 further including changing the value of N for different operating conditions.

5. The method of claim 3 wherein I=8.

6. The method of claim 3 further including re-writing the codeword quadset onto the medium in response to the determining step indicating the codeword quadset should be rewritten.

7. Apparatus for performing the method of claim 3.

8. The apparatus of claim 7 in combination with a head arrangement for writing the data onto the tracks of the medium and for reading the data from the tracks of the medium after the data have been written onto the tracks by the head arrangement.

9. A method of determining if data on an elongated storage medium having I recorded parallel elongated tracks storing a data set including J=2I sub datasets has areas that require some data in the data set to be rewritten; each sub dataset including K codeword pairs and L parity bytes having values determined by bits in the K codeword pairs of the particular sub dataset; each codeword pair including (a) a header identifying the codeword, (b) user data and (c) parity bytes; the tracks being divided into M=(K+L) longitudinal segments where said dataset is stored; segment m including the I tracks, track i of segment m including longitudinally spaced codeword pairs from different sub datasets, where m=0 . . . (M−1), i=0 . . . (I−1) so that segment i stores a codeword quad set including J codeword pairs from the J sub datasets, the method comprising:

storing a plurality of bits for each codeword pair of each codeword quad set;

attempting to read each codeword quad set from the medium;

determining, from each header successfully read from the medium, the codeword pair identification of each codeword in the quad sets successfully read from the header and reading the remainder of the codeword pair successfully read from the medium;

checking for errors in the codeword of each identified codeword pair; and determining whether each codeword quadset is acceptably recorded by evaluating each codeword quadset for header and codeword pair errors and combining the evaluations.

10. The method of claim 9 further including re-writing the codeword quadset onto the medium in response to the determining step indicating the codeword quadset is not acceptably recorded.

11. Apparatus for performing the method of claim 9.

12. The apparatus of claim 11 in combination with a head arrangement for writing the data onto the tracks of the medium and for reading the data from the tracks of the medium after the data have been written onto the tracks by the head arrangement.

* * * * *